United States Patent
Lian et al.

(10) Patent No.: US 11,273,833 B2
(45) Date of Patent: Mar. 15, 2022

(54) ACCELERATION SLIP REGULATION METHOD AND DEVICE FOR FOUR-WHEEL DRIVE ELECTRIC VEHICLE

(71) Applicant: BYD COMPANY LIMITED, Shenzhen (CN)

(72) Inventors: Yubo Lian, Shenzhen (CN); Heping Ling, Shenzhen (CN); Hao Chen, Shenzhen (CN); Guo Tian, Shenzhen (CN); Xinming Wei, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 348 days.

(21) Appl. No.: 16/474,636

(22) PCT Filed: Dec. 27, 2017

(86) PCT No.: PCT/CN2017/118949
§ 371 (c)(1),
(2) Date: Jun. 28, 2019

(87) PCT Pub. No.: WO2018/121595
PCT Pub. Date: Jul. 5, 2018

(65) Prior Publication Data
US 2019/0344796 A1 Nov. 14, 2019

(30) Foreign Application Priority Data
Dec. 29, 2016 (CN) .......................... 201611251605.3

(51) Int. Cl.
*B60W 30/18* (2012.01)
*B60K 17/356* (2006.01)
(Continued)

(52) U.S. Cl.
CPC ..... *B60W 30/18172* (2013.01); *B60K 17/356* (2013.01); *B60L 15/20* (2013.01);
(Continued)

(58) Field of Classification Search
CPC ......... B60W 30/18172; B60W 40/105; B60W 2552/40; B60W 2520/10; B60W 2520/28;
(Continued)

(56) References Cited

U.S. PATENT DOCUMENTS 5,376,868 A   12/1994  Toyoda et al.
6,321,154 B1  11/2001  Schmitt et al.
(Continued)

FOREIGN PATENT DOCUMENTS

CN    2862042 Y    1/2007
CN    101024377 A  8/2007
(Continued)

OTHER PUBLICATIONS

The World Intellectual Property Organization (WIPO) International Search Report for PCT/CN2017/118949 dated Mar. 23, 2018 6 Pages.
(Continued)

*Primary Examiner* — Russell Frejd
(74) *Attorney, Agent, or Firm* — Anova Law Group, PLLC (57) ABSTRACT

An acceleration slip regulation method and device for a four-wheel drive electric vehicle are disclosed. The method comprises the following steps: detecting wheel speeds of four wheels of an electric vehicle and a depth of depression of an accelerator pedal; estimating a vehicle speed of the electric vehicle according to the wheel speeds of the four wheels, determining a road condition at the location of the electric vehicle according to the wheel speeds of the four wheels and the vehicle speed, and acquiring a required torque of the electric vehicle according to the depth of depression of the accelerator pedal, wherein the road condition comprising a low adhesion starting road, a joint road, and a bisectional road; and performing acceleration slip
(Continued)

regulation on the four wheels respectively according to the road condition and the required torque. The control method can ensure that the wheels do not slip, the electric vehicle does not undergo lateral displacement and a yaw rate is kept within a certain range after the electric vehicle activates acceleration slip. The control method can maximize the use of ground adhesion to improve the escape capability of the electric vehicle.

14 Claims, 7 Drawing Sheets

(51) Int. Cl.
*B60L 15/20* (2006.01)
*B60W 40/105* (2012.01)

(52) U.S. Cl.
CPC ...... *B60W 40/105* (2013.01); *B60L 2240/463* (2013.01); *B60L 2240/465* (2013.01); *B60L 2260/28* (2013.01); *B60W 2520/10* (2013.01); *B60W 2520/28* (2013.01); *B60W 2520/30* (2013.01); *B60W 2540/10* (2013.01); *B60W 2552/40* (2020.02); *B60W 2720/26* (2013.01); *B60W 2720/30* (2013.01); *B60W 2720/40* (2013.01); *B60Y 2200/91* (2013.01); *B60Y 2300/18175* (2013.01); *B60Y 2400/82* (2013.01)

(58) Field of Classification Search
CPC ......... B60W 2520/30; B60W 2540/10; B60W 2720/26; B60W 2720/30; B60W 2720/40; B60L 15/20; B60L 2240/463; B60L 2240/465; B60L 2260/28; B60L 2250/26; B60L 2240/421; B60L 3/102; B60L 2220/42; B60L 15/28; B60L 2240/423; B60Y 2200/91; B60Y 2300/18175; B60Y 2400/82; Y02T 10/64; Y02T 10/72
See application file for complete search history.

(56) References Cited

U.S. PATENT DOCUMENTS

| | | | |
|---|---|---|---|
| 2004/0040758 A1* | 3/2004 | Shimizu | B60K 28/16 180/65.225 |
| 2007/0041167 A1* | 2/2007 | Nachi | F21V 29/70 362/33 |
| 2010/0292882 A1* | 11/2010 | Murata | B60W 30/18 701/22 |
| 2012/0293317 A1* | 11/2012 | Hanna | B60K 23/08 340/441 |
| 2014/0121870 A1* | 5/2014 | Lee | B60W 30/18109 701/22 |

FOREIGN PATENT DOCUMENTS

| | | |
|---|---|---|
| CN | 101423028 A | 5/2009 |
| CN | 101786452 A | 7/2010 |
| CN | 201792857 U | 4/2011 |
| CN | 102958735 A | 3/2013 |
| CN | 103879350 A | 6/2014 |
| CN | 104002699 A | 8/2014 |
| CN | 104742888 A | 7/2015 |
| CN | 105253032 A | 1/2016 |
| CN | 105751919 A | 7/2016 |
| CN | 106114499 A | 11/2016 |
| CN | 106183892 A | 12/2016 |
| CN | 106218444 A | 12/2016 |
| JP | 2007209068 A | 8/2007 |

OTHER PUBLICATIONS

Yan et al., Research on Acceleration Slip Regulation of 6×6 Electrically-driven Wheeled Vehicle, ACTA Armamentarh, Sep. 2014, p. 1-9, 35(9), China.

* cited by examiner

ACCELERATION SLIP REGULATION METHOD AND DEVICE FOR FOUR-WHEEL DRIVE ELECTRIC VEHICLE

CROSS-REFERENCE TO RELATED APPLICATIONS

This application is a national phase entry under 35 U.S.C. § 371 of International Application No. PCT/CN2017/118949, filed on Dec. 27, 2017, which claims priority to Chinese Patent Application No. 201611251605.3, filed on Dec. 29, 2016, entitled "Acceleration Slip Regulation Method and Device for Four-Wheel Drive Electric Vehicle", content of all of which is incorporated herein by reference in its entirety.

FIELD

The present application relates to the technical field of electric vehicles and, in particular, to an acceleration slip regulation method for a four-wheel drive electric vehicle and an acceleration slip regulation device for a four-wheel drive electric vehicle.

BACKGROUND

In the related art, an acceleration slip regulation method for a four-wheel hub electric vehicle is proposed. Specifically, an optimal slip ratio of a wheel is calculated in real time by a road recognition algorithm, and a desired rotational speed of the wheel is calculated from the optimal slip ratio of the wheel. Then, according to the state of the wheel, a compensation torque of the wheel is calculated; if the wheel is slipping, a desired wheel speed is taken as a control target, and the compensation torque is calculated by a PID controller of the wheel speed; and if the wheel does not slip, the compensation torque is zero. Moreover, during vehicle speed control, a desired vehicle speed is taken as a control target, and a command torque of a motor is calculated according to a vehicle speed controller. Finally, the compensation torque and the command torque described above are added and input into the motor to achieve acceleration slip regulation for the four-wheel hub electric vehicle.

However, although the above technology mentions that the compensation torque of the motor is calculated according to the road recognition and the PID controller, it does not give an indication of how each wheel acts to make the vehicle not destabilize when the vehicle runs on different roads. Because the four motor torques of the four-wheel hub electric vehicle are controlled separately without affecting each other, if the vehicle runs on a bisectional road (i.e., only one wheel is located on a low adhesion road, same-side wheels are located on a low adhesion road and diagonal wheels are located on a low adhesion road), acceleration slip is triggered, and the vehicle may destabilize.

SUMMARY

An objective of the present application is to at least resolve one of the technical problems in the related art to some extent.

In view of this, the present invention is directed to an acceleration slip regulation method for a four-wheel drive electric vehicle. The control method can ensure that wheels do not slip, the electric vehicle does not undergo lateral displacement and a yaw rate is kept within a certain range after an electric vehicle activates acceleration slip. The control method can maximize the use of ground adhesion to improve the escape capability of the electric vehicle.

The present invention is also directed to an acceleration slip regulation device for a four-wheel drive electric vehicle.

To achieve the above objectives, a first aspect embodiment of the present application provides an acceleration slip regulation method for a four-wheel drive electric vehicle. The method includes the following steps: detecting wheel speeds of four wheels of an electric vehicle and a depth of depression of an accelerator pedal; estimating a vehicle speed of the electric vehicle according to the wheel speeds of the four wheels, determining a road condition at the location of the electric vehicle according to the wheel speeds of the four wheels and the vehicle speed, and acquiring a required torque of the electric vehicle according to the depth of depression of the accelerator pedal, the road condition including a low adhesion starting road, a joint road, and a bisectional road; and performing acceleration slip regulation on the four wheels respectively according to the road condition and the required torque.

According to the acceleration slip regulation method for a four-wheel drive electric vehicle of the embodiment of the present invention, a road condition at the location of an electric vehicle is determined according to wheel speeds of four wheels of the electric vehicle and a vehicle speed, and a corresponding control strategy is taken according to the road condition to perform acceleration slip regulation on the electric vehicle. Thus, it can be ensured that wheels do not slip, the electric vehicle does not undergo lateral displacement and a yaw rate is kept within a certain range after an electric vehicle activates acceleration slip, and the use of ground adhesion can be maximized to improve the escape capability of the electric vehicle.

To achieve the above objectives, a second aspect embodiment of the present application provides an acceleration slip regulation device for a four-wheel drive electric vehicle. The device includes: a detection module, adapted to detect wheel speeds of four wheels of the electric vehicle and a depth of depression of an accelerator pedal; an estimation module, adapted to estimate a vehicle speed of the electric vehicle according to the wheel speeds of the four wheels; a determination module, adapted to determine a road condition at the location of the electric vehicle according to the wheel speeds of the four wheels and the vehicle speed, the road condition including a low adhesion starting road, a joint road, and a bisectional road; an acquisition module, adapted to acquire a required torque of the electric vehicle according to the depth of depression of the accelerator pedal; and a control module, connected to the determination module and the acquisition module separately and adapted to perform acceleration slip regulation on the four wheels respectively according to the road condition and the required torque.

According to the acceleration slip regulation device for a four-wheel drive electric vehicle of the embodiment of the present invention, a road condition at the location of an electric vehicle is determined according to wheel speeds of four wheels of the electric vehicle and a vehicle speed, and a corresponding control strategy is taken according to the road condition to perform acceleration slip regulation on the electric vehicle. Thus, it can be ensured that wheels do not slip, the electric vehicle does not undergo lateral displacement and a yaw rate is kept within a certain range after an electric vehicle activates acceleration slip, and the use of ground adhesion can be maximized to improve the escape capability of the electric vehicle.

BRIEF DESCRIPTION OF THE DRAWINGS

These and other aspects and advantages of embodiments of the present invention will become apparent and more readily appreciated from the following descriptions made with reference to the drawings, in which.

DETAILED DESCRIPTION

The following describes in detail embodiments of the present invention. Examples of the embodiments are shown in the accompanying drawings, where reference signs that are the same or similar may represent same or similar components or components that have same or similar functions. The following embodiments described with reference to the accompanying drawings are exemplary, and are intended to describe the present invention and cannot be construed as a limitation to the present invention.

An acceleration slip regulation method for a four-wheel drive electric vehicle and an acceleration slip regulation device for a four-wheel drive electric vehicle according to an embodiment of the present invention are described below with reference to the accompanying drawings.

Figure 1:
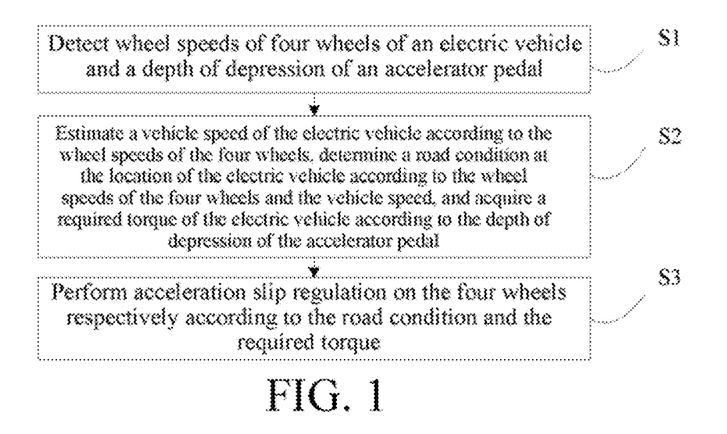
FIG. 1 is a flowchart of an acceleration slip regulation method for a four-wheel drive electric vehicle according to an embodiment of the present invention.

FIG. 1 is a flowchart of an acceleration slip regulation method for a four-wheel drive electric vehicle according to an embodiment of the present invention. As shown in FIG. 1, the method includes the following steps:

S1: Detect wheel speeds of four wheels of an electric vehicle and a depth of depression of an accelerator pedal.

In the embodiment of the present invention, the wheel speed of each wheel of the electric vehicle can be detected by a wheel speed sensor mounted on each wheel of the electric vehicle, and the depth of depression of the accelerator pedal can be detected by a displacement sensor mounted on the accelerator pedal. The wheel speed sensor may be, but is not limited to, a magneto-electric wheel speed sensor, a Hall type wheel speed sensor, etc.

S2: Estimate a vehicle speed of the electric vehicle according to the wheel speeds of the four wheels, determine a road condition at the location of the electric vehicle according to the wheel speeds of the four wheels and the vehicle speed, and acquire a required torque of the electric vehicle according to the depth of depression of the accelerator pedal.

Specifically, when estimating the vehicle speed of the electric vehicle according to on the wheel speed, the following methods may be employed: (1) a minimum wheel speed method, where when the electric vehicle performs acceleration slip regulation during driving, since the wheel slips and the wheel speed is greater than the vehicle speed, the minimum wheel speed of the four wheels may be taken as the vehicle speed; (2) a slope method, where through the analysis and processing of a large number of experimental data, an average acceleration achievable by the electric vehicle on various roads is determined, based on this, in the process of acceleration slip regulation, an initial vehicle speed entering the acceleration slip regulation is determined, after a road condition and an acceleration slip operation condition are recognized, the acceleration of the electric vehicle is determined, and a speed value is calculated in real time according to a speed formula as a reference vehicle speed; and (3) a determination method based on a vehicle braking mechanical model, where the method can correct a reference vehicle speed in real time on the basis of a model such as an entire vehicle and a tire, and can better simulate a real vehicle speed. It will be appreciated that the method for estimating a vehicle speed in the embodiment of the present invention is not limited to the above three types.

In the embodiment of the present invention, the road condition includes a low adhesion starting road, a joint road, and a bisectional road.

The road condition of the joint road includes entering a high adhesion road from a low adhesion road and entering a low adhesion road from a high adhesion road. The road condition of the bisectional road includes that only one wheel is located on a low adhesion road, same-side wheels are located on a low adhesion road, diagonal wheels are located on a low adhesion road and three wheels are located on a low adhesion road.

Further, in an embodiment of the present invention, determining a road condition at the location of the electric vehicle according to the wheel speeds of the four wheels and the vehicle speed specifically includes: judging whether the wheel speeds of the four wheels are greater than the vehicle speed, respectively; determining, if the wheel speeds of the four wheels are all greater than the vehicle speed, that the road condition is the low adhesion starting road; determining, if the wheel speeds of front wheels of the electric vehicle are both equal to the vehicle speed and the wheel speeds of rear wheels are both greater than the vehicle speed, that the road condition is the joint road and the electric vehicle enters a high adhesion road from a low adhesion road; determining, if the wheel speeds of the front wheels are both greater than the vehicle speed and the wheel speeds of the rear wheels are both equal to the vehicle speed, that the road condition is the joint road and the electric vehicle enters a low adhesion road from a high adhesion road; determining, if the wheel speed of only one wheel is greater than the vehicle speed and the wheel speeds of the other three wheels are all equal to the vehicle speed, that the road condition is the bisectional road and the single wheel is located on a low adhesion road; determining, if the wheel speed of one same-side wheel is greater than the vehicle speed and the wheel speed of the other same-side wheel is equal to the vehicle speed, that the road condition is the bisectional road and one same-side wheel is located on a low adhesion road; determining, if the wheel speed of one diagonal wheel is greater than the vehicle speed and the wheel speed of the other diagonal wheel is equal to the vehicle speed, that the road condition is the bisectional road and one diagonal wheel is located on a low adhesion road; and determining, if the wheel speeds of three wheels are greater than the vehicle speed and the wheel speed of the other wheel is equal to the vehicle speed, that the road condition is the bisectional road and the three wheels are located on a low adhesion road.

S3: Perform acceleration slip regulation on the four wheels respectively according to the road condition and the required torque.

In an embodiment of the present invention, if the road condition is the low adhesion starting road, the four wheels of the electric vehicle are controlled to activate acceleration slip, each wheel being separately controlled by a corresponding motor.

Figure 2A:
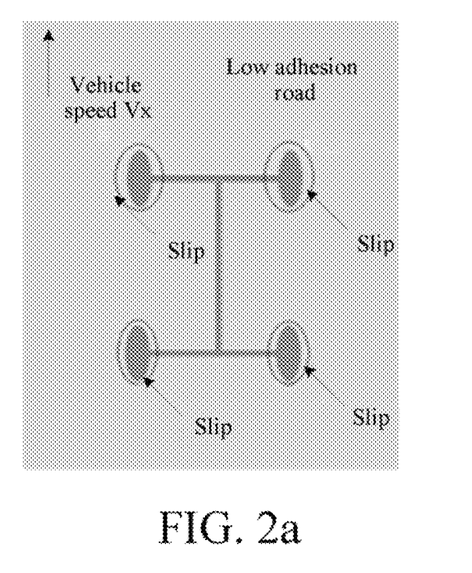
FIG. 2a to FIG. 2g are respective diagrams of a road condition at the location of an electric vehicle according to specific embodiments of the present invention.

Specifically, as shown in FIG. 2a, if the wheel speeds of the four wheels of the electric vehicle are all greater than the vehicle speed, the four wheels simultaneously slip, that is, the electric vehicle runs on the low adhesion starting road. At this time, the four wheels are controlled to activate acceleration slip, and each wheel is separately controlled by the corresponding motor without affecting each other.

Figure 2B:
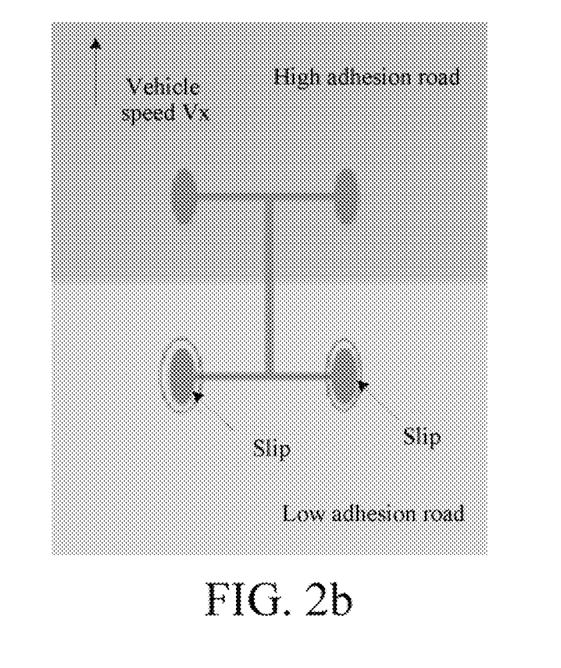

In another embodiment of the present invention, as shown in FIG. 2b, if the electric vehicle enters a high adhesion road from a low adhesion road, an integral coefficient in a PI controller corresponding to a motor of a front wheel is increased respectively to increase an acceleration slip torque of the front wheel, and the front wheel is controlled to exit the acceleration slip when the acceleration slip torque is greater than or equal to the required torque.

Figure 3:
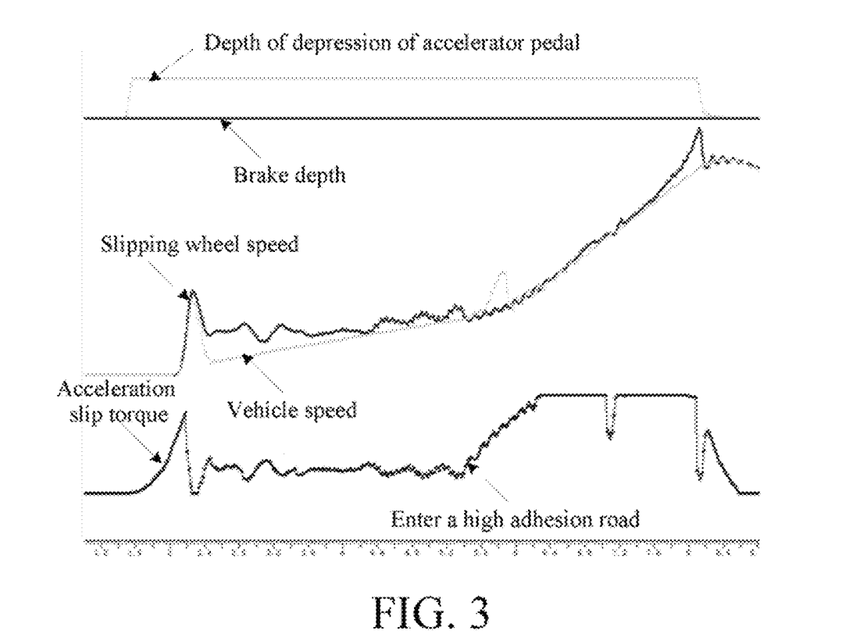
FIG. 3 is a curve chart of real vehicle test data of an electric vehicle from a low adhesion road to a high adhesion road according to an embodiment of the present invention.

Specifically, as shown in FIG. 3, when the electric vehicle runs on the low adhesion road, the four wheels all activate the acceleration slip, the wheel speeds are greater than the vehicle speed, and the wheel speeds are equal to the vehicle speed after entering the high adhesion road. At this time, the integral coefficient in the PI controller corresponding to the motor of the front wheel is increased respectively, so the corresponding acceleration slip torque will be quickly increased. When the acceleration slip torque is equal to the required torque, the front wheel is controlled to exit the acceleration slip.

It will be appreciated that there will be a short-time situation where the front wheel enters the high adhesion road while the rear wheel is still on the low adhesion road during this process. At this time, the front wheel is processed according to the above strategy, the rear wheel is still in an acceleration slip activating state, and after the rear wheel enters the high adhesion road, the rear wheel is also processed according to the above strategy, where the front and rear wheels are processed separately and do not affect each other.

Figure 2C:
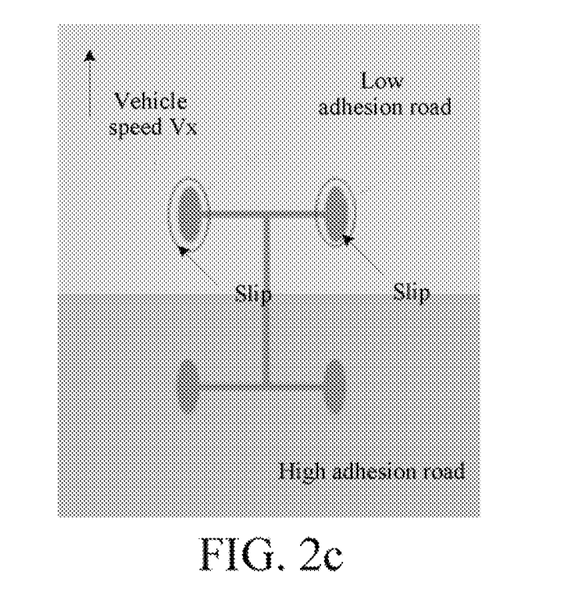

Correspondingly, as shown in FIG. 2c, if the electric vehicle enters the low adhesion road from the high adhesion road, the front wheel is controlled to activate the acceleration slip, and torque decrease is performed on the motor of the front wheel to prevent the front wheel from slipping.

Figure 4:
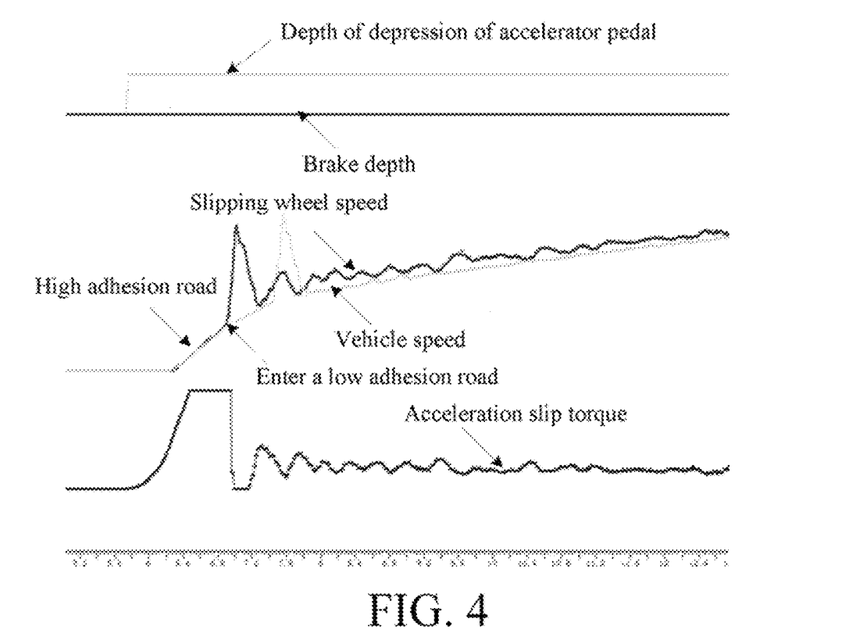
FIG. 4 is a curve chart of real vehicle test data of an electric vehicle from a high adhesion road to a low adhesion road according to an embodiment of the present invention.

Specifically, as shown in FIG. 4, when the wheel enters the high adhesion road from the low adhesion road, if a driver depresses the accelerator pedal deeply and a road adhesion coefficient is small, the wheel may suddenly slip. At this time, the front wheel is controlled to immediately activate the acceleration slip to reduce a drive torque for the motor of the front wheel, so that the front wheel does not slip or slips briefly, the rear wheel is not processed when it does not enter the low adhesion road, and the acceleration slip is activated after the rear wheel also enters the low adhesion road.

Figure 2D:
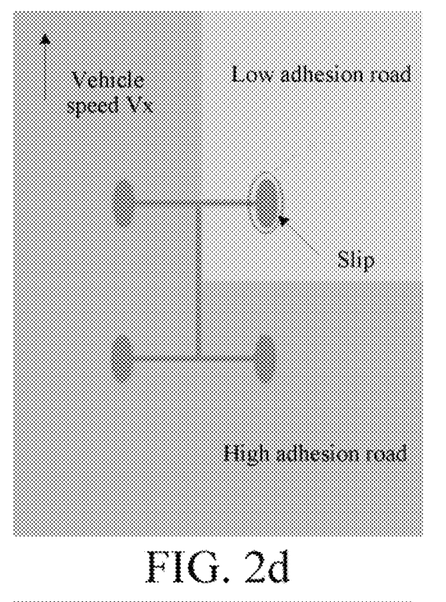

In yet another embodiment of the present invention, as shown in FIG. 2d, if only one wheel is located on the low adhesion road, whether the vehicle speed is less than a preset vehicle speed is judged; if the vehicle speed is less than the preset vehicle speed, the wheel on the low adhesion road is controlled to activate acceleration slip; and if the vehicle speed is greater than or equal to the preset vehicle speed, torque limiting is performed on a motor of a wheel on the high adhesion road, which is coaxial with the wheel on the low adhesion road, so as to prevent the electric vehicle from lateral displacement, a drive torque for the motor of the wheel on the high adhesion road, which is coaxial with the wheel on the low adhesion road, being equal to a sum of a drive torque for a motor of the wheel on the low adhesion road and a preset torque limit difference.

In the embodiment of the present invention, the preset torque limit difference may be derived by simulation and real vehicle matching.

Specifically, if the vehicle speed is low, it can be regarded as the electric vehicle escaping or running at a low speed. At this time, only the wheel on the low adhesion road is controlled to activate acceleration slip while the other wheels are not processed, that is, the drive torques for motors of the other wheels are the required torque. If the vehicle speed is high, it is necessary to perform appropriate torque limiting on the motor of the wheel on the high adhesion road, which is coaxial with a slipping wheel (that is, the wheel on the low adhesion road), so that the electric vehicle is prevented from lateral displacement. The torque limit method is: obtaining the drive torque for the motor of the wheel on the high adhesion road, which is coaxial with the slipping wheel by adding the drive torque for the motor of the wheel on the low adhesion road to the preset torque limit difference.

Figure 2E:
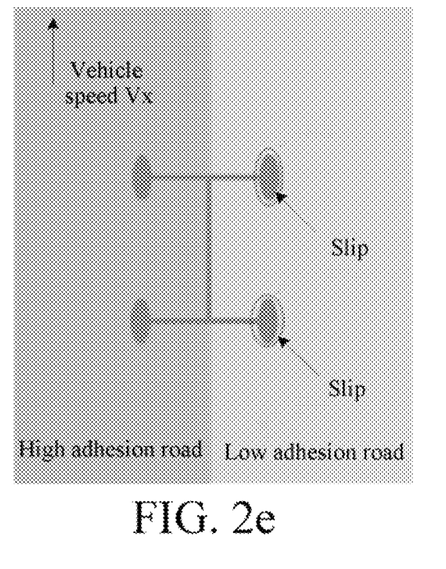

In a fourth embodiment of the present invention, as shown in FIG. 2e, if same-side wheels are located on the low adhesion road, the wheels on the low adhesion road are controlled to activate acceleration slip, and torque limiting is performed on wheels on the high adhesion road, so as to prevent the electric vehicle from lateral displacement, a drive torque for motors of the wheels on the high adhesion road being equal to a sum of a motor torque for motors of the corresponding wheels on the low adhesion road and a preset torque limit difference.

Figure 2F:
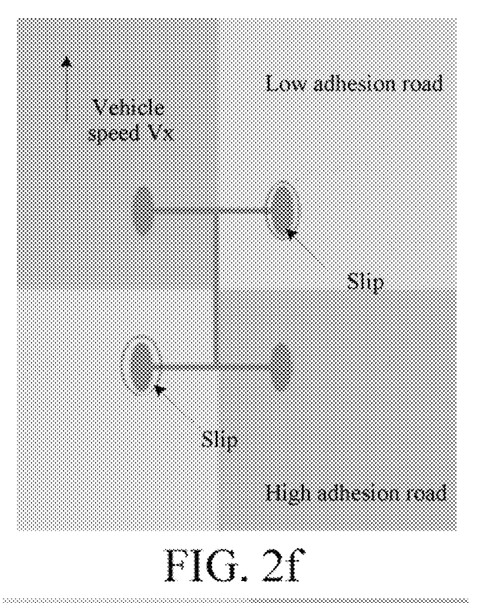

In a fifth embodiment of the present invention, as shown in FIG. 2f, if diagonal wheels are located on the low adhesion road, the diagonal wheels on the low adhesion road are controlled to activate acceleration slip, and torque decrease is performed on motors of the diagonal wheels on the low adhesion road.

Specifically, if one diagonal wheel is located on the low adhesion road, the diagonal wheel on the low adhesion road is controlled to activate acceleration slip, so that a motor undergoes torque decrease. The other diagonal wheel on the high adhesion road does not activate acceleration slip, and the corresponding motor does not perform torque limiting, and directly responds to the required torque. It will be appreciated that the electric vehicle is prevented from lateral displacement at this time.

Figure 2G:
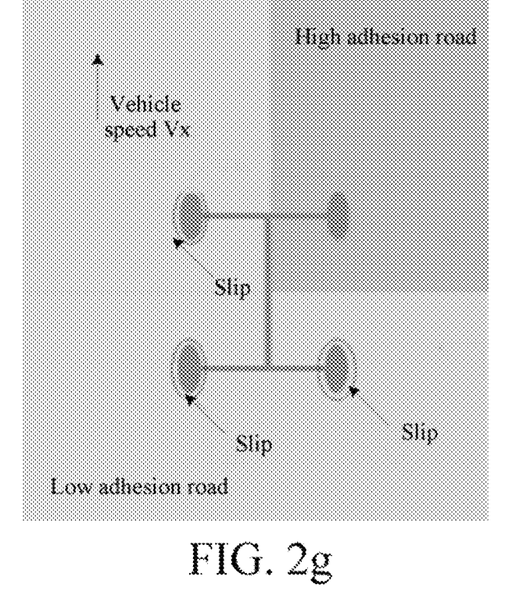

In a sixth embodiment of the present invention, as shown in FIG. 2g, if three wheels are located on the low adhesion road, the three wheels on the low adhesion road are controlled to activate acceleration slip, and whether the vehicle speed is less than a preset vehicle speed is judged; if the vehicle speed is less than the preset vehicle speed, a drive torque for a motor of a wheel on the high adhesion road is controlled to be the required torque; and if the vehicle speed is greater than or equal to the preset vehicle speed, torque limiting is performed on the motor of the wheel on the high adhesion road, so as to prevent the electric vehicle from lateral displacement, the drive torque for the motor of the wheel on the high adhesion road being equal to a sum of a drive torque for a motor of a wheel, which is located on the low adhesion road and coaxial with the wheel on the high adhesion road, and a preset torque limit difference.

Specifically, if three wheels are located on the low adhesion road, the three wheels on the low adhesion road are controlled to activate acceleration slip. If the vehicle speed is low, it can be regarded as the electric vehicle running at a low speed or escaping, and the motor on the high adhesion road responds to the required torque. If the vehicle speed is high, it is possible to perform appropriate torque limiting on the motor of the wheel on the high adhesion road in order to prevent the electric vehicle from lateral displacement. The torque limit method is: obtaining the drive torque for the motor of the wheel on the high adhesion road by adding the drive torque for the motor of the wheel, which is located on the low adhesion road and coaxial with the wheel on the high adhesion road to the preset torque limit difference.

Figure 5:
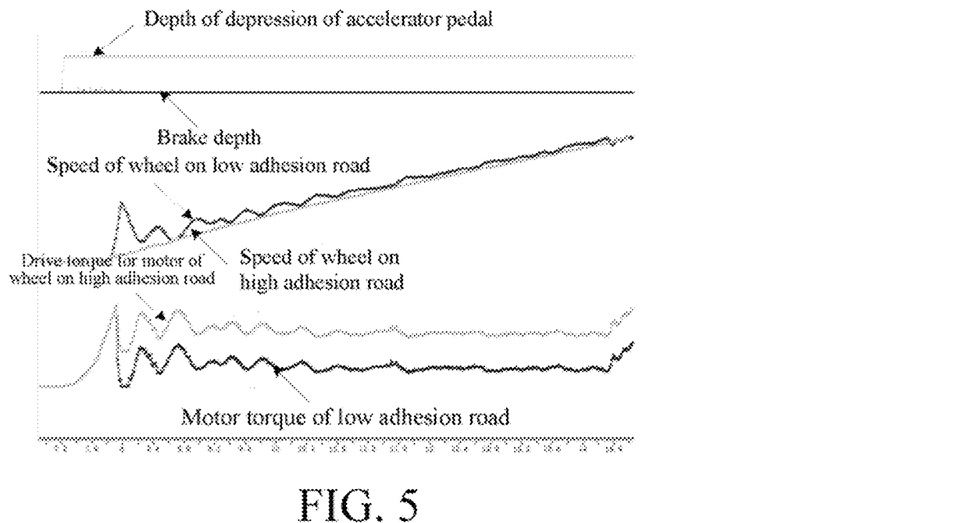
FIG. 5 is a curve chart of real vehicle test data of an electric vehicle on a bisectional road according to an embodiment of the present invention.

Specifically, as shown in FIG. 5, when the road condition at the location of the electric vehicle is the bisectional road, the drive torque for the motor of the wheel on the high adhesion road and the drive torque for the motor of the wheel on the low adhesion road keep an appropriate torque difference, so that the vehicle does not undergo lateral displacement.

According to the acceleration slip regulation method for a four-wheel drive electric vehicle of the embodiment of the present invention, a road condition at the location of an electric vehicle is determined according to wheel speeds of four wheels of the electric vehicle and a vehicle speed, and a corresponding control strategy is taken according to the road condition to perform acceleration slip regulation on the electric vehicle. Thus, it can be ensured that wheels do not slip, the electric vehicle does not undergo lateral displacement and a yaw rate is kept within a certain range after an electric vehicle activates acceleration slip, and the use of ground adhesion can be maximized to improve the escape capability of the electric vehicle.

Figure 6:
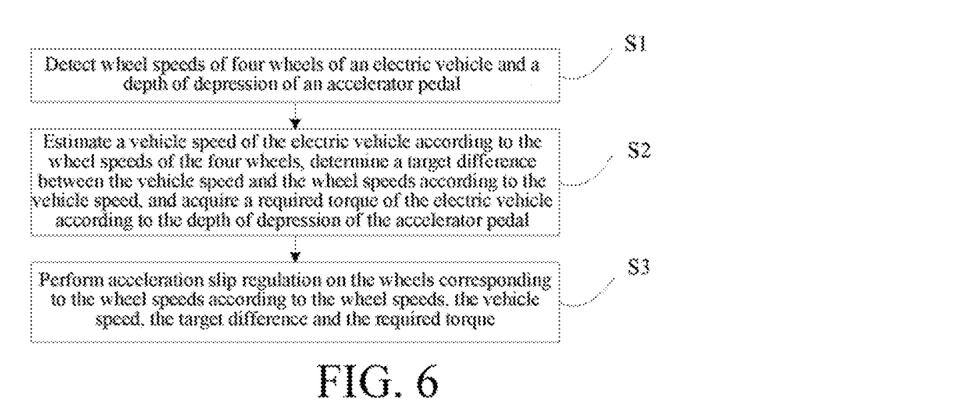
FIG. 6 is a flowchart of an acceleration slip regulation method for a four-wheel drive electric vehicle according to another embodiment of the present invention.

In addition, it is to be noted that, for the wheel on the low adhesion road in the above embodiment, in order to keep a suitable slip ratio, in an embodiment of the present invention, as shown in FIG. 6, step S2 further includes: determining, according to the vehicle speed, a target difference between the vehicle speed and the wheel speed.

In the embodiment of the present invention, a corresponding relationship exists between the vehicle speed and the target difference. When the vehicle speed is greater than 10 km/h, the corresponding target difference ranges from 1.5 km/h to 2 km/h. For example, if the vehicle speed is 15 km/h, the corresponding target difference is 2 km/h.

Specifically, a target difference Dv_aim is not fixed and varies along with the change of the vehicle speed. When the vehicle speed is low, the target difference Dv_aim is large, and when the vehicle speed is high, the target difference Dv_aim is small.

Further, as shown in FIG. 6, step S3 further includes: performing acceleration slip regulation on the wheel corresponding to the wheel speed according to the wheel speed, the vehicle speed, the target difference and the required torque.

Specifically, if the difference between the wheel speed and the vehicle speed is greater than the target difference, a PI controller for acceleration slip regulation corresponding to the motor of the wheel is corrected according to the wheel speed, the vehicle speed and the target difference, so as to output a corresponding acceleration slip torque through the corrected PI controller; whether the acceleration slip torque is less than the required torque is judged; if the acceleration slip torque is less than the required torque, it is determined that the drive torque for the motor of the wheel is the acceleration slip torque; and if the acceleration slip torque is greater than or equal to the required torque, it is determined that the drive torque for the motor of the wheel is the required torque and the wheel is controlled to exit acceleration slip.

In the embodiment of the present invention, the PI controller for acceleration slip regulation corresponding to the motor of the wheel introduces, on the basis of the conventional classical PI control, a feedback amount (Dvx−Dv_aim) to correct a proportional coefficient P and an integral coefficient I, where Dvx is a difference between the wheel speed and the vehicle speed, and Dv_aim is a target difference corresponding to a current vehicle speed.

Specifically, the integral coefficient I of the PI controller is corrected according to the difference Dvx between the wheel speed and the vehicle speed and the target difference Dv_aim, and the proportional coefficient of the PI controller is kept unchanged; and further, a difference between the difference Dvx and the target difference Dv_aim is used as a feedback value of the PI controller, and the corresponding acceleration slip torque T_value is output.

The appropriate value of the proportional coefficient P may be unchanged by simulation and real vehicle debugging, and the integral coefficient I of the corrected PI controller is positively proportional to an absolute value of (Dvx−Dv_aim). That is, as the absolute value is larger, the integral coefficient is larger; as the absolute value is smaller, the integral coefficient is smaller; and when the absolute value is 0, the integral coefficient is 0.

Specifically, (Dvx−Dv_aim) is used as feedback and is multiplied by the proportional coefficient to obtain a proportional term P_value; meanwhile, a product of (Dvx−Dv_aim) and the integral coefficient is integrated to obtain an integral term I_value; and then the proportional term and the integral term are added together to obtain the acceleration slip torque T_value. If the calculated T_value is less than 0, it is limited to 0, that is, the acceleration slip process does not give a negative drive torque to the motor of the wheel.

Figure 7:
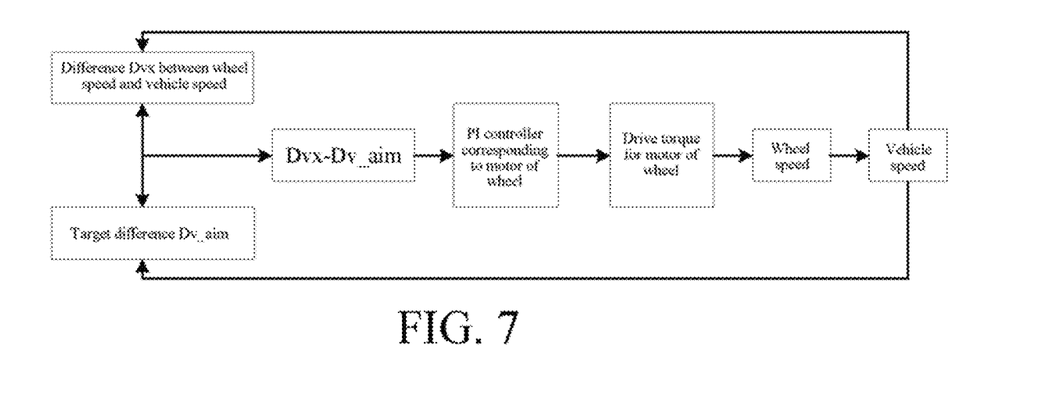
FIG. 7 is a principle schematic diagram of an acceleration slip regulation method for a four-wheel drive electric vehicle according to another embodiment of the present invention.

In order to facilitate understanding of the above acceleration slip regulation method for a single wheel, it can be illustrated by FIG. 7, FIG. 8a, FIG. 8b, and FIG. 9:

As shown in FIG. 7, an accelerator signal is inputted through an accelerator pedal of an electric vehicle, and a required torque of the electric vehicle is acquired according to the accelerator signal. Wheel speeds of four wheels of the electric vehicle are detected by wheel speed sensors, and a vehicle speed of the electric vehicle may be estimated according to the speeds of four wheels. Whether the wheel speed of each wheel is greater than the vehicle speed is judged, the wheel of which the wheel speed is greater than the vehicle speed is controlled to activate acceleration slip regulation, a target difference Dv_aim between the vehicle speed and the wheel speed is then acquired according to the vehicle speed, and a difference Dvx between the wheel speed of the wheel and the vehicle speed may be calculated.

Further, when Dvx is greater than Dv_aim, a difference (that is, Dvx−Dv_aim) between the difference Dvx and the target difference Dv_aim is calculated, and a proportional coefficient P and an integral coefficient I of a PI controller for acceleration slip regulation corresponding to a motor of the wheel are corrected according to the difference. The proportional coefficient P may be kept unchanged at a certain value by simulation and real vehicle debugging, and the integral coefficient I is positively proportional to an absolute value of (Dvx−Dv_aim). That is, as the absolute value is larger, the corrected integral coefficient is larger; as the absolute value is smaller, the integral coefficient is smaller; and when the absolute value is 0, the integral coefficient is 0. Further, an acceleration slip torque is outputted according to the corrected PI controller, when the acceleration slip torque is less than the required torque, the drive torque for the motor of the wheel is taken as the acceleration slip torque, and when the acceleration slip torque is greater than or equal to the required torque, the drive torque for the motor of the wheel is taken as the required torque and the electric vehicle is controlled to exit acceleration slip. Therefore, the wheel of the electric vehicle may be stabilized under the acceleration slip, an appropriate slip ratio is kept, and the ground driving force of the wheel is increased.

Figure 8A:
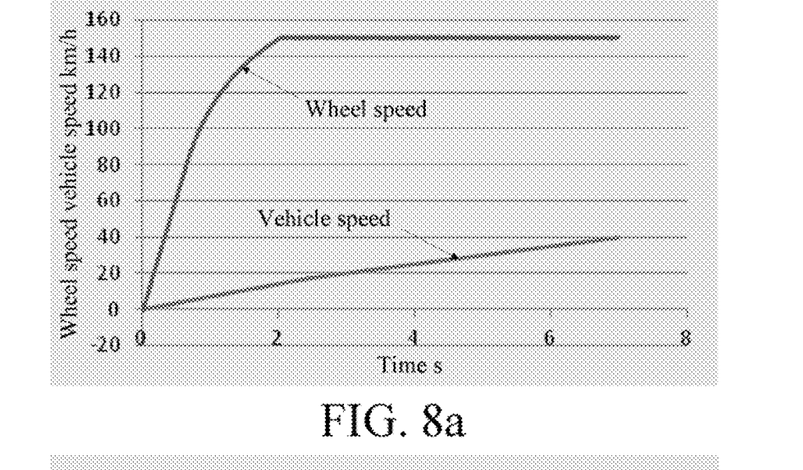
FIG. 8a and FIG. 8b are respective curve charts of a joint simulation of Carsim and Simulink when acceleration slip is not activated and acceleration slip is activated according to another embodiment of the present invention.
Figure 8B:
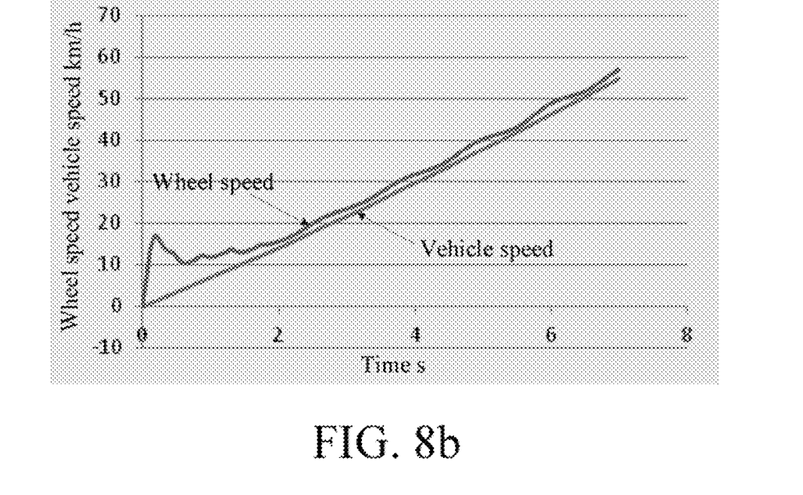

As shown in FIG. 8a, when a driver slams an accelerator on the low adhesion road and the wheel does not activate acceleration slip, the wheel speed of the slipping wheel will rise rapidly to the maximum speed of the motor of the wheel, and cannot be stabilized. As shown in FIG. 8b, after the acceleration slip is activated, the wheel may be controlled by the PI controller with a slight slip, so that the wheel speed is gradually stabilized.

Figure 9:
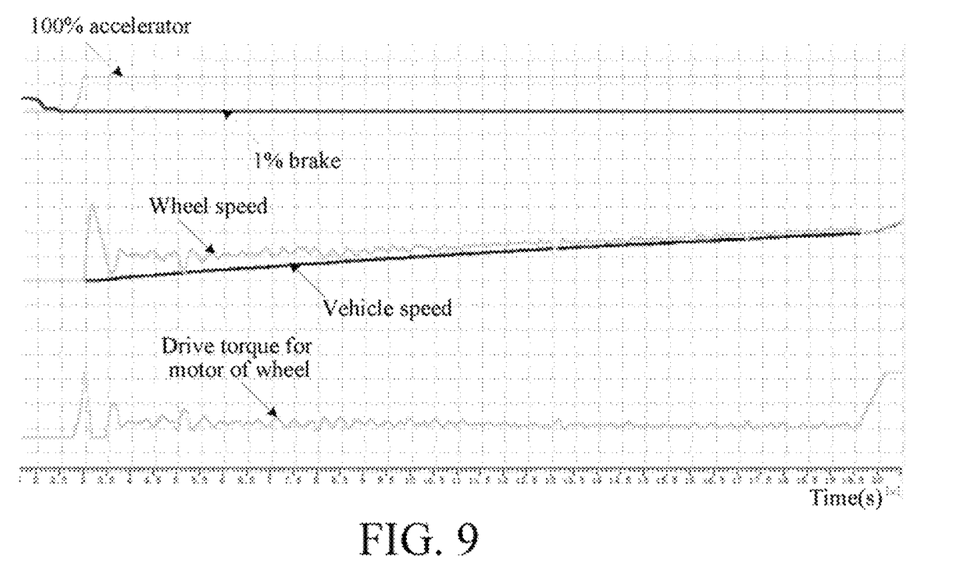
FIG. 9 is a curve chart of a real vehicle matching test on acceleration slip regulation for a four-wheel drive electric vehicle according to another embodiment of the present invention.

As shown in FIG. 9, in a real vehicle test, the test condition is full-accelerator starting on the low adhesion road, and meanwhile, the comfort of the driver and passengers is taken into consideration. It can be seen from FIG. 9 that the above acceleration slip regulation has a better regulation effect and a good real vehicle experience.

In summary, according to the acceleration slip regulation method for a four-wheel drive electric vehicle, the road condition at the location of the electric vehicle is determined according to the wheel speeds of the four wheels of the electric vehicle and the vehicle speed, acceleration slip regulation is performed on the electric vehicle by taking a corresponding control strategy according to the road condition, and for the wheel activating acceleration slip regulation, when the difference between the wheel speed and the vehicle speed exceeds a target difference, the drive torque for the motor of the wheel is subjected to PI adjustment by taking the difference between the wheel speed and the vehicle speed as a control target. Thus, it can be ensured that wheels do not slip, the electric vehicle does not undergo lateral displacement and a yaw rate is kept within a certain range after the electric vehicle activates acceleration slip, and the use of ground adhesion can be maximized, so that the difference between the wheel speed and the vehicle speed is stabilized within a corresponding target difference range to keep an appropriate slip ratio, which helps to improve the escape capability of the electric vehicle.

Figure 10:
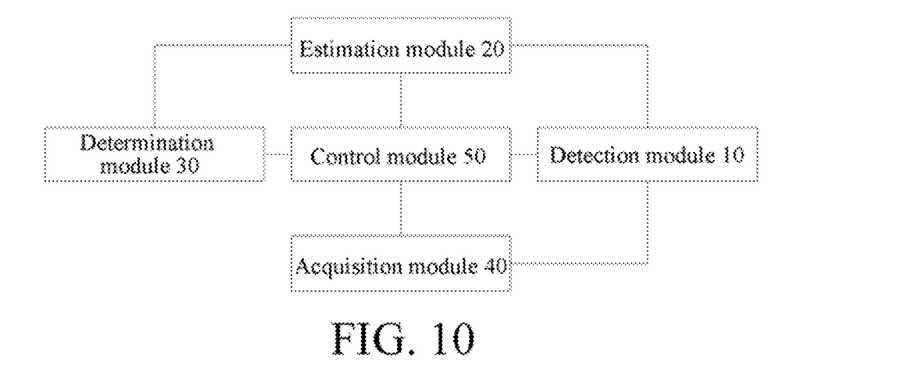
FIG. 10 is a structure block diagram of an acceleration slip regulation device for a four-wheel drive electric vehicle according to an embodiment of the present invention.

FIG. 10 is a structure block diagram of an acceleration slip regulation device for a four-wheel drive electric vehicle according to an embodiment of the present invention. As shown in FIG. 10, the device includes: a detection module 10, an estimation module 20, a determination module 30, an acquisition module 40, and a control module 50.

The detection module 10 is adapted to detect wheel speeds of four wheels of an electric vehicle and a depth of depression of an accelerator pedal. The estimation module 20 is adapted to estimate a vehicle speed of the electric vehicle according to the wheel speeds of the four wheels. The determination module 30 is adapted to determine a road condition at the location of the electric vehicle according to the wheel speeds of the four wheels and the vehicle speed, the road condition including a low adhesion starting road, a joint road, and a bisectional road. The acquisition module 40 is adapted to acquire a required torque of the electric vehicle according to the depth of depression of the accelerator pedal. The control module 50 is connected to the determination module 30 and the acquisition module 40 separately, and the control module 50 is adapted to perform acceleration slip regulation on the four wheels respectively according to the road condition and the required torque.

In the embodiment of the present invention, the determination module 30 is specifically adapted to: judge whether the wheel speeds of the four wheels are greater than the vehicle speed, respectively; determine, when the wheel speeds of the four wheels are all greater than the vehicle speed, that the road condition is the low adhesion starting road; determine, when the wheel speeds of front wheels of the electric vehicle are both equal to the vehicle speed and the wheel speeds of rear wheels are both greater than the vehicle speed, that the road condition is the joint road and the electric vehicle enters a high adhesion road from a low adhesion road; determine, when the wheel speeds of the front wheels are both greater than the vehicle speed and the wheel speeds of the rear wheels are both equal to the vehicle speed, that the road condition is the joint road and the electric vehicle enters a low adhesion road from a high adhesion road; determine, when the wheel speed of only one wheel is greater than the vehicle speed and the wheel speeds of the other three wheels are all equal to the vehicle speed, that the road condition is the bisectional road and the single wheel is located on a low adhesion road; determine, when the wheel speed of one same-side wheel is greater than the vehicle speed and the wheel speed of the other same-side wheel is equal to the vehicle speed, that the road condition is the bisectional road and one same-side wheel is located on a low adhesion road; determine, when the wheel speed of one diagonal wheel is greater than the vehicle speed and the wheel speed of the other diagonal wheel is equal to the vehicle speed, that the road condition is the bisectional road and one diagonal wheel is located on a low adhesion road; and determine, when the wheel speeds of three wheels are greater than the vehicle speed and the wheel speed of the other wheel is equal to the vehicle speed, that the road condition is the bisectional road and the three wheels are located on a low adhesion road.

Further, in an embodiment of the present invention, as shown in FIG. 2a, the control module 50 is specifically adapted to: control, when the road condition is the low adhesion starting road, the four wheels of the electric vehicle to activate acceleration slip, each wheel being separately controlled by a corresponding motor.

In another embodiment of the present invention, as shown in FIG. 2b, the control module 50 is further specifically adapted to: increase, when the electric vehicle enters a high adhesion road from a low adhesion road, an integral coefficient in a PI controller corresponding to a motor of a front wheel respectively to increase an acceleration slip torque of the motor of the front wheel, and control the front wheel to exit the acceleration slip when the acceleration slip torque is greater than or equal to the required torque. As shown in FIG. 2c, when the electric vehicle enters the low adhesion road from the high adhesion road, the front wheels are controlled to both activate the acceleration slip, and drive torques for motors of the front wheels are reduced respectively to prevent the front wheels from slipping.

In yet another embodiment of the present invention, as shown in FIG. 2d, the control module 50 is further specifically adapted to: judge, when only one single wheel is located on a low adhesion road, whether the vehicle speed is less than a preset vehicle speed; control, when the vehicle speed is less than the preset vehicle speed, the wheel on the low adhesion road to activate acceleration slip; and perform, when the vehicle speed is greater than or equal to the preset vehicle speed, torque limiting on a wheel on a high adhesion road, which is coaxial with the wheel on the low adhesion road, so as to prevent the electric vehicle from lateral displacement, a drive torque for the motor of the wheel on the high adhesion road, which is coaxial with the wheel on the low adhesion road, being equal to a sum of a drive torque for a motor of the wheel on the low adhesion road and a preset torque limit difference.

In an embodiment of the present invention, as shown in FIG. 2e, the control module 50 is further specifically adapted to: control, when one same-side wheel is located on a low adhesion road, the wheel on the low adhesion road to activate acceleration slip, and perform torque limiting on a wheel on a high adhesion road, so as to prevent the electric vehicle from lateral displacement, a drive torque for the motor of the wheel on the high adhesion road being equal to a sum of a corresponding drive torque for a motor of the coaxial wheel on the low adhesion road and a preset torque limit difference.

In a fifth embodiment of the present invention, as shown in FIG. 2f, the control module 50 is further specifically adapted to: control, when one diagonal wheel is located on a low adhesion road, the diagonal wheel on the low adhesion road to activate acceleration slip, and perform torque decrease on a motor of the diagonal wheel on the low adhesion road.

In a sixth embodiment of the present invention, the control module 50 is further specifically adapted to: control, when three wheels are located on a low adhesion road, the three wheels on the low adhesion road to activate acceleration slip, and judge whether the vehicle speed is less than a preset vehicle speed; control, when the vehicle speed is less than the preset vehicle speed, a drive torque for a motor of a wheel on a high adhesion road to be the required torque; and perform, when the vehicle speed is greater than or equal to the preset vehicle speed, torque limiting on the motor of the wheel on the high adhesion road, so as to prevent the electric vehicle from lateral displacement, the drive torque for the motor of the wheel on the high adhesion road being equal to a sum of a drive torque for a motor of a wheel, which is located on the low adhesion road and coaxial with the wheel on the high adhesion road, and a preset torque limit difference.

It is to be noted that the specific implementation manner of the acceleration slip regulation device for a four-wheel drive electric vehicle according to the embodiment of the present invention is the same as the specific implementation manner of the acceleration slip regulation method for a four-wheel drive electric vehicle according to the embodiment of the present invention. In order to reduce redundancy, there is no repeated description.

According to the acceleration slip regulation device for a four-wheel drive electric vehicle of the embodiment of the present invention, a road condition at the location of an electric vehicle is determined according to wheel speeds of four wheels of the electric vehicle and a vehicle speed, and a corresponding control strategy is taken according to the road condition to perform acceleration slip regulation on the electric vehicle. Thus, it can be ensured that wheels do not slip, the electric vehicle does not undergo lateral displacement and a yaw rate is kept within a certain range after an electric vehicle activates acceleration slip, and the use of ground adhesion can be maximized to improve the escape capability of the electric vehicle.

In addition, it is noted that, for the wheel on the low adhesion road in the above embodiment, in order to keep a suitable slip ratio, in an embodiment of the present invention, the determination module 30 is further adapted to determine, according to the vehicle speed, a target difference between the vehicle speed and the wheel speed. The control module 50 is further adapted to perform acceleration slip regulation on the wheel corresponding to the wheel speed according to the wheel speed, the vehicle speed, the target difference and the required torque.

In the embodiment of the present invention, a corresponding relationship exists between the vehicle speed and the target difference. When the vehicle speed is greater than 10 km/h, the corresponding target difference ranges from 1.5 km/h to 2 km/h. For example, if the vehicle speed is 15 km/h, the corresponding target difference is 2 km/h.

Specifically, a target difference Dv_aim is not fixed and varies along with the change of the vehicle speed. When the vehicle speed is low, the target difference Dv_aim is large, and when the vehicle speed is high, the target difference Dv_aim is small.

In an embodiment of the present invention, the control module 50 is specifically adapted to: correct, when the difference between the wheel speed and the vehicle speed is greater than the target difference, a PI controller for acceleration slip regulation corresponding to the motor of the wheel according to the wheel speed, the vehicle speed and the target difference, so as to output a corresponding acceleration slip torque through the corrected PI controller; judge whether the acceleration slip torque is less than the required torque; determine, when the acceleration slip torque is less than the required torque, that the drive torque for the motor of the wheel is the acceleration slip torque; and determine, when the acceleration slip torque is greater than or equal to the required torque, that the drive torque for the motor of the wheel is the required torque and the wheel is controlled to exit acceleration slip.

In an embodiment of the present invention, the PI controller introduces, on the basis of the conventional classical PI control, a feedback amount to correct a proportional coefficient P and an integral coefficient I.

Specifically, the control module 50 is specifically adapted to: correct, when correcting the PI controller for acceleration slip regulation corresponding to the motor of the wheel according to the wheel speed, the vehicle speed and the target difference so as to output a corresponding acceleration slip torque through the corrected PI controller, the integral coefficient of the PI controller according to the difference Dvx between the wheel speed and the vehicle speed and the target difference Dv_aim, and keep the proportional coefficient of the PI controller unchanged; and use a difference between the difference Dvx and the target difference Dv_aim as a feedback value of the PI controller, and output the corresponding acceleration slip torque T_value.

The appropriate value of the proportional coefficient P may be unchanged by simulation and real vehicle debugging, and the integral coefficient I of the corrected PI controller is positively proportional to an absolute value of (Dvx−Dv_aim). That is, as the absolute value is larger, the integral coefficient is larger; as the absolute value is smaller, the integral coefficient is smaller; and when the absolute value is 0, the integral coefficient is 0.

Specifically, (Dvx−Dv_aim) used as feedback is multiplied by the proportional coefficient to obtain a proportional term P_value; meanwhile, a product of (Dvx−Dv_aim) and the integral coefficient is integrated to obtain an integral term I_value; and then the proportional term and the integral term are added together to obtain the acceleration slip torque T_value. If the calculated T_Value is less than 0, it is limited to 0, that is, the acceleration slip process does not give a negative drive torque to the motor of the wheel.

It is to be noted that the specific implementation manner of the acceleration slip regulation device for a four-wheel drive electric vehicle according to this embodiment may refer to the specific implementation manner of the acceleration slip regulation method for a four-wheel drive electric vehicle according to the above embodiment of the present invention. In order to reduce redundancy, there is no repeated description.

In summary, according to the acceleration slip regulation device for a four-wheel drive electric vehicle, the determination module determines the road condition at the location of the electric vehicle according to the wheel speeds of the four wheels of the electric vehicle and the vehicle speed, the control module performs acceleration slip regulation on the electric vehicle by taking a corresponding control strategy according to the road condition, and for the wheel activating acceleration slip regulation, when the difference between the wheel speed and the vehicle speed exceeds a target difference, the control module performs pi adjustment on the drive torque for the motor of the wheel by taking the difference between the wheel speed and the vehicle speed as a control target. Thus, it can be ensured that wheels do not slip, the electric vehicle does not undergo lateral displacement and a yaw rate is kept within a certain range after the electric vehicle activates acceleration slip, and the use of ground adhesion can be maximized, so that the difference between the wheel speed and the vehicle speed is stabilized within a corresponding target difference range to keep an appropriate slip ratio, which helps to improve the escape capability of the electric vehicle.

The foregoing embodiments are only exemplary embodiments of the present invention and are not to limit the present invention in any forms. Though the above embodiments are disclosed in the present invention, the embodiments are not to limit the present invention. Those skilled in the art can use the methods and technical contents disclosed above to make various possible variations and modifications to the technical solutions of the present invention or make equivalent changes to obtain equivalent embodiments without departing from the scope of the technical solutions of the present invention. Therefore, any simple changes, equivalent variations, and modifications made to the above embodiments according to the technical essence of the present invention without departing from the contents of the technical solutions of the present invention shall fall within the scope of the technical solutions of the present invention.

What is claimed is:

1. An acceleration slip regulation method for a four-wheel drive electric vehicle, comprising:
   detecting wheel speeds of four wheels of the electric vehicle and a depth of depression of an accelerator pedal;
   estimating a vehicle speed of the electric vehicle according to the wheel speeds of the four wheels, determining a road condition at a location of the electric vehicle according to the wheel speeds of the four wheels and the vehicle speed, and acquiring a required torque of the electric vehicle according to the depth of depression of the accelerator pedal, the road condition comprising a low adhesion starting road, a joint road, and a bisectional road; and
   performing acceleration slip regulation on the four wheels respectively according to the road condition and the required torque,
   wherein the step of performing acceleration slip regulation on the four wheels respectively according to the road condition and the required torque further comprises:
      determining, when a single wheel is located on a low adhesion road, whether the vehicle speed is less than a preset vehicle speed;
      controlling, when the vehicle speed is less than the preset vehicle speed, the wheel on the low adhesion road to activate acceleration slip; and
      performing, when the vehicle speed is greater than or equal to the preset vehicle speed, torque limiting on a motor of a wheel on a high adhesion road, which is coaxial with the wheel on the low adhesion road, so as to prevent the electric vehicle from lateral displacement, a drive torque for the motor of the wheel on the high adhesion road, which is coaxial with the wheel on the low adhesion road, being equal to a sum of a drive torque for a motor of the wheel on the low adhesion road and a preset torque limit difference.

2. The acceleration slip regulation method for a four-wheel drive electric vehicle according to claim 1, wherein the determining a road condition at the location of the electric vehicle according to the wheel speeds of the four wheels and the vehicle speed comprises:
   determining whether the wheel speeds of the four wheels are greater than the vehicle speed, respectively;
   determining, when the wheel speeds of the four wheels are all greater than the vehicle speed, that the road condition is the low adhesion starting road;
   determining, when the wheel speeds of front wheels of the electric vehicle are both equal to the vehicle speed and the wheel speeds of rear wheels are both greater than the vehicle speed, that the road condition is the joint road and the electric vehicle enters a high adhesion road from a low adhesion road;
   determining, when the wheel speeds of the front wheels are both greater than the vehicle speed and the wheel speeds of the rear wheels are both equal to the vehicle speed, that the road condition is the joint road and the electric vehicle enters a low adhesion road from a high adhesion road;
   determining, when the wheel speed of only one wheel is greater than the vehicle speed and the wheel speeds of the other three wheels are all equal to the vehicle speed, that the road condition is the bisectional road and the single wheel is located on a low adhesion road;
   determining, when the wheel speed of one same-side wheel is greater than the vehicle speed and the wheel speed of the other same-side wheel is equal to the vehicle speed, that the road condition is the bisectional road and one same-side wheel is located on a low adhesion road;

determining, when the wheel speed of one diagonal wheel is greater than the vehicle speed and the wheel speed of the other diagonal wheel is equal to the vehicle speed, that the road condition is the bisectional road and one diagonal wheel is located on a low adhesion road; and determining, when the wheel speeds of three wheels are greater than the vehicle speed and the wheel speed of the other wheel is equal to the vehicle speed, that the road condition is the bisectional road and the three wheels are located on a low adhesion road.

3. The acceleration slip regulation method for a four-wheel drive electric vehicle according to claim 1, wherein the step of performing acceleration slip regulation on the four wheels respectively according to the road condition and the required torque comprises:

controlling, when the road condition is the low adhesion starting road, the four wheels of the electric vehicle to activate acceleration slip, each wheel being separately controlled by a corresponding motor.

4. The acceleration slip regulation method for a four-wheel drive electric vehicle according to claim 1, wherein the step of performing acceleration slip regulation on the four wheels respectively according to the road condition and the required torque further comprises:

increasing, when the electric vehicle enters a high adhesion road from a low adhesion road, an integral coefficient in a PI controller corresponding to a motor of a front wheel respectively to increase an acceleration slip torque of the front wheel, and controlling the front wheel to exit the acceleration slip when the acceleration slip torque is greater than or equal to the required torque; and controlling, when the electric vehicle enters a low adhesion road from a high adhesion road, the front wheel to activate the acceleration slip, and performing torque decrease on the motor of the front wheel to prevent the front wheel from slipping.

5. The acceleration slip regulation method for a four-wheel drive electric vehicle according to claim 1, wherein the step of performing acceleration slip regulation on the four wheels respectively according to the road condition and the required torque further comprises:

controlling, when one same-side wheel is located on a low adhesion road, the wheel on the low adhesion road to activate acceleration slip, and performing torque limiting on a motor of a wheel on a high adhesion road, so as to prevent the electric vehicle from lateral displacement, a drive torque for the motor of the wheel on the high adhesion road being equal to a sum of a corresponding drive torque for a motor of the wheel on the low adhesion road and a preset torque limit difference.

6. The acceleration slip regulation method for a four-wheel drive electric vehicle according to claim 1, wherein the step of performing acceleration slip regulation on the four wheels respectively according to the road condition and the required torque further comprises:

controlling, when one diagonal wheel is located on a low adhesion road, the diagonal wheel on the low adhesion road to activate acceleration slip, and performing torque decrease on a motor of the diagonal wheel on the low adhesion road.

7. The acceleration slip regulation method for a four-wheel drive electric vehicle according to claim 1, wherein the step of performing acceleration slip regulation on the four wheels respectively according to the road condition and the required torque further comprises:

controlling, when three wheels are located on a low adhesion road, the three wheels on the low adhesion road to activate acceleration slip, and determining whether the vehicle speed is less than a preset vehicle speed;

controlling, when the vehicle speed is less than the preset vehicle speed, a drive torque for a motor of a wheel on a high adhesion road to be the required torque; and performing, when the vehicle speed is greater than or equal to the preset vehicle speed, torque limiting on the motor of the wheel on the high adhesion road, so as to prevent the electric vehicle from lateral displacement, the drive torque for the motor of the wheel on the high adhesion road being equal to a sum of a drive torque for a motor of a wheel, which is located on the low adhesion road and coaxial with the wheel on the high adhesion road, and a preset torque limit difference.

8. An acceleration slip regulation device for a four-wheel drive electric vehicle, comprising:

a detection module, configured to detect wheel speeds of four wheels of the electric vehicle and a depth of depression of an accelerator pedal;

an estimation module, configured to estimate a vehicle speed of the electric vehicle according to the wheel speeds of the four wheels;

a determination module, configured to determine a road condition at a location of the electric vehicle according to the wheel speeds of the four wheels and the vehicle speed, the road condition comprising a low adhesion starting road, a joint road, and a bisectional road;

an acquisition module, configured to acquire a required torque of the electric vehicle according to the depth of depression of the accelerator pedal; and a control module, connected with the determination module and the acquisition module separately and configured to perform acceleration slip regulation on the four wheels respectively according to the road condition and the required torque, wherein the control module is further specifically configured to:

determine, when only one single wheel is located on a low adhesion road, whether the vehicle speed is less than a preset vehicle speed;

control, when the vehicle speed is less than the preset vehicle speed, the wheel on the low adhesion road to activate acceleration slip; and perform, when the vehicle speed is greater than or equal to the preset vehicle speed, torque limiting on a wheel on a high adhesion road, which is coaxial with the wheel on the low adhesion road, so as to prevent the electric vehicle from lateral displacement, a drive torque for the motor of the wheel on the high adhesion road, which is coaxial with the wheel on the low adhesion road, being equal to a sum of a drive torque for a motor of the wheel on the low adhesion road and a preset torque limit difference.

9. The acceleration slip regulation device for a four-wheel drive electric vehicle according to claim 8, wherein the determination module is specifically configured to:

determine whether the wheel speeds of the four wheels are greater than the vehicle speed, respectively;

determine, when the wheel speeds of the four wheels are all greater than the vehicle speed, that the road condition is the low adhesion starting road;

determine, when the wheel speeds of front wheels of the electric vehicle are both equal to the vehicle speed and the wheel speeds of rear wheels are both greater than the vehicle speed, that the road condition is the joint road and the electric vehicle enters a high adhesion road from a low adhesion road;

determine, when the wheel speeds of the front wheels are both greater than the vehicle speed and the wheel speeds of the rear wheels are both equal to the vehicle speed, that the road condition is the joint road and the electric vehicle enters a low adhesion road from a high adhesion road;

determine, when the wheel speed of only one wheel is greater than the vehicle speed and the wheel speeds of the other three wheels are all equal to the vehicle speed, that the road condition is the bisectional road and the single wheel is located on a low adhesion road;

determine, when the wheel speed of one same-side wheel is greater than the vehicle speed and the wheel speed of the other same-side wheel is equal to the vehicle speed, that the road condition is the bisectional road and one same-side wheel is located on a low adhesion road;

determine, when the wheel speed of one diagonal wheel is greater than the vehicle speed and the wheel speed of the other diagonal wheel is equal to the vehicle speed, that the road condition is the bisectional road and one diagonal wheel is located on a low adhesion road; and determine, when the wheel speeds of three wheels are greater than the vehicle speed and the wheel speed of the other wheel is equal to the vehicle speed, that the road condition is the bisectional road and the three wheels are located on a low adhesion road.

10. The acceleration slip regulation device for a four-wheel drive electric vehicle according to claim 9, wherein the control module is specifically configured to:

control, when the road condition is the low adhesion starting road, the four wheels of the electric vehicle to activate acceleration slip, each wheel being separately controlled by a corresponding motor.

11. The acceleration slip regulation device for a four-wheel drive electric vehicle according to claim 9, wherein the control module is further specifically configured to:

increase, when the electric vehicle enters a high adhesion road from a low adhesion road, an integral coefficient in a PI controller corresponding to a motor of a front wheel respectively to increase an acceleration slip torque of the motor of the front wheel, and control the front wheel to exit the acceleration slip when the acceleration slip torque is greater than or equal to the required torque; and control, when the electric vehicle enters a low adhesion road from a high adhesion road, the front wheel to activate the acceleration slip, and perform torque decrease on the motor of the from wheel to prevent the front wheel from slipping.

12. The acceleration slip regulation device for a four-wheel drive electric vehicle according to claim 9, wherein the control module is further specifically configured to:

control, when one same-side wheel is located on a low adhesion road, the wheel on the low adhesion road to activate acceleration slip, and perform torque limiting on a wheel on a high adhesion road, so as to prevent the electric vehicle from lateral displacement, a drive torque for the motor of the wheel on the high adhesion road being equal to a sum of a corresponding drive torque for a motor of the coaxial wheel on the low adhesion road and a preset torque limit difference.

13. The acceleration slip regulation device for a four-wheel drive electric vehicle according to claim 9, wherein the control module is further specifically configured to:

control, when one diagonal wheel is located on a low adhesion road, the diagonal wheel on the low adhesion road to activate acceleration slip, and perform torque decrease on a motor of the diagonal wheel on the low adhesion road.

14. The acceleration slip regulation device for a four-wheel drive electric vehicle according to claim 9, wherein the control module is further specifically configured to:

control, when three wheels are located on a low adhesion road, the three wheels on the low adhesion road to activate acceleration slip, and determine whether the vehicle speed is less than a preset vehicle speed;

control, when the vehicle speed is less than the preset vehicle speed, a drive torque for a motor of a wheel on a high adhesion road to be the required torque; and perform, when the vehicle speed is greater than or equal to the preset vehicle speed, torque limiting on the motor of the wheel on the high adhesion road, so as to prevent the electric vehicle from lateral displacement, the drive torque for the motor of the wheel on the high adhesion road being equal to a sum of a drive torque for a motor of a wheel, which is located on the low adhesion road and coaxial with the wheel on the high adhesion road, and a preset torque limit difference.

\* \* \* \* \*